Oct. 15, 1929.  F. L. GRISSOM ET AL  1,731,491
PARACHUTE FOR FLYING MACHINES
Filed Feb. 9, 1929   2 Sheets-Sheet 1
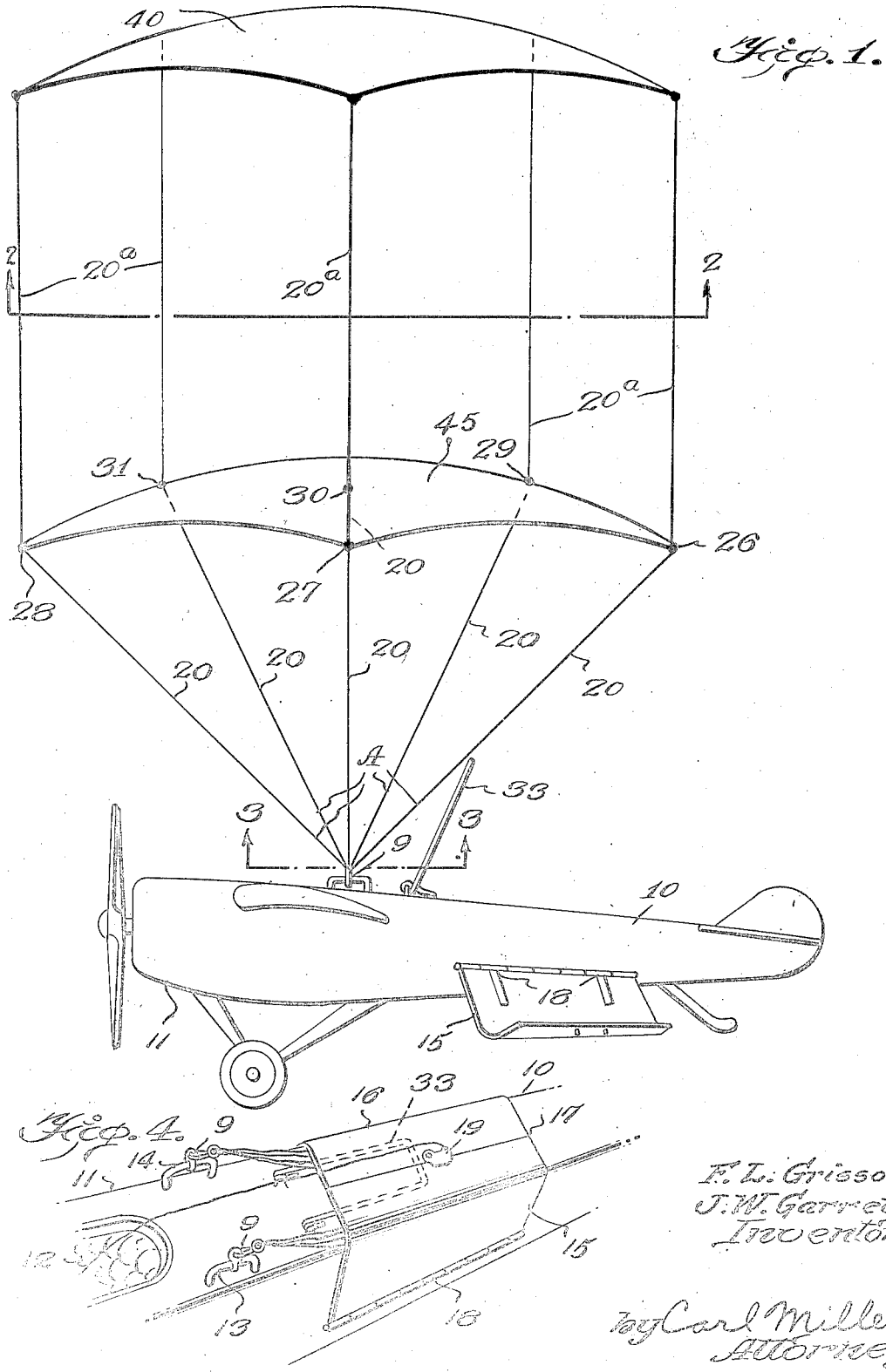

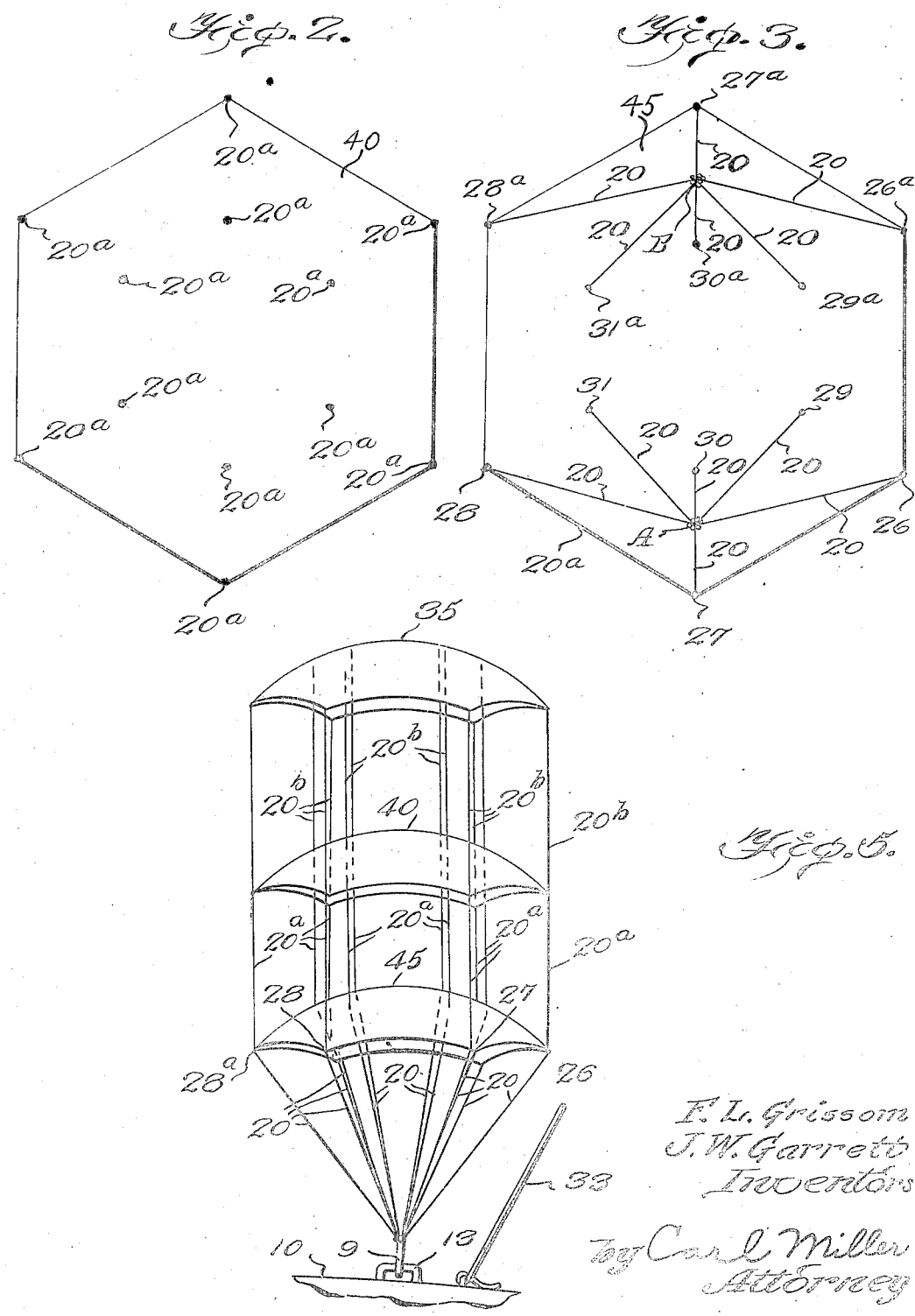

Patented Oct. 15, 1929

1,731,491

UNITED STATES PATENT OFFICE

FRANCIS LEVI GRISSOM AND JOHN W. GARRETT, OF EL PASO, TEXAS

PARACHUTE FOR FLYING MACHINES

Application filed February 9, 1929. Serial No. 338,748.

This invention relates to parachute equipped aeroplanes, and has for its object the production of a plurality of parachutes or floaters of the character which will be of durable and economical construction and highly efficient in use or operation. One of the objects of the invention is to provide a parachute having means whereby it is forcibly ejected from the pack to assure positive operation of the same. Another object of the invention is to provide means whereby the parachute may be easily and quickly transferred from the aeroplane itself to suitable harness secured upon an aviator's or passenger's body, so that said aviator's or passenger's life may be saved, even though the aeroplane itself cannot be so saved, in event that it should catch on fire or otherwise become unwise to attempt to save it.

With the foregoing and other objects in view which will appear as the description proceeds, the invention consists of certain novel details of construction and combination of parts which will be hereinafter more fully described and pointed out in the claims, it being understood that various minor changes may be made in the construction and arrangement of the parts without departing from the spirit or sacrificing any of the advantages of our invention as set forth in the appended claims.

The invention will be best understood by reference to the accompanying drawings forming a part of this specification, and in which:

Figure 1 is a side elevation of the plurality of parachutes or floaters in open position supporting an aeroplane.

Figure 2 is an inverted plan view of the parachute or floater furthest away from the aeroplane, taken on line 2—2 of Figure 1 in the direction of the arrows.

Figure 3 is an inverted plan view of the parachute or floater next above the aeroplane, taken on line 3—3 of Figure 1, in the direction of the arrows.

Figure 4 is an angular view of a portion of the aeroplane, showing the pack in closed position thereby enclosing the parachutes or floaters around the fuselage behind the cockpit.

Figure 5 is a slightly perspective view showing particularly the twelve supporting cords passing from one floater to the next above floater, all of which floaters are in open position, being attached to a fragmentary portion of an aeroplane.

Referring to the drawings in detail, 10 indicates the fuselage of an aeroplane 11, upon the top of which brackets 13 and 14 are securely fastened thereto. Mounted upon the opposite sides of the fuselage 10, are two flaps 15 and 16, to form what is known as pack 17. These flaps are each secured by spring hinges 18 so that the tendency is for each of the flaps to fly open and remain open unless otherwise held closed or together by pull operated lock 19 connected by control cord 12.

All of the floaters are of hexagonal configuration or shape and are normally retained in this pack 17, however, the first parachute per se or hexagonal floater 45 is provided with twelve separate supporting cords indicated as 20, which are divided into equal groups of six, indicated generally as A and B. At the lower end of each of the converging groups of cords A and B, snap buckles 9 are secured thereon, so that each of said groups will in turn be attached to brackets 13 and 14 and likewise may be readily detached from the same if desired.

The floater 45 as previously stated, is generally in the shape of a hexagon and each of the respective twelve cords are secured to the floater 45 in the places as especially shown in Figure 3. It will be seen that six of these twelve cords are secured to the floater 45 at the six points 26, 27, 28 and 26ª, 27ª, 28ª where the angles are formed by the sides of the hexagon. The remaining six cords are secured to the floater 45 at six different interior points, each of which points of securance are located approximately midway between the center and vertices of the hexagon, being at 29, 30, 31 and 29ª, 30ª, 31ª, all of which is most clearly shown in Figure 3.

Referring now to the second hexagonal shaped floater 40. This second floater 40 is secured to the first floater 45 by twelve supporting but parallel extending cords 20ª which cords 20ª are located at the same relative points of securance as previously described in connection with floater 45 and applies equally as well to this second floater 40.

In the operation of the device, the floaters 45 and 40 are normally retained in the pack 17. The aviator or passenger desiring to release these parachutes merely pulls the control operating cord 12 which in turn causes the lock 19 to release the flaps 15 and 16, so that said flaps will instantaneously open as shown in Figure 1. Floater or parachute 40 is normally placed on top of ejecting U-shaped spring 33 the ends of which are secured to fuselage 11 and the other end being free, so that this floater 40 or the floater above that one in case of three floaters (and so on) is immediately ejected and caught by the wind pressure and thereby fully opens, to initially carry its burden. Following floater 40, the next or succeeding floater 45 will in turn be caught by the wind and likewise will open and assume a position below the first opened floater. In Figure 3 there is shown a third floater 35 which is secured to second floater 40 by means of twelve supporting parallel extending cords 20ᵇ which cords 20ᵇ are arranged and secured in the same relative positions upon the floater 35 as the supporting cords 20 and 20ª are arranged and secured upon the floaters 45 and 40 respectively. It is to be understood that the U-shaped spring 33 in this case will be placed directly underneath this floater 35 when this floater is enclosed in pack 17. Of course when control cord is pulled, the floater 35 is ejected by the spring, and then said floater will be caught by wind pressure. Then floater 40 is next pulled from pack 17 to open position by floater 35 and likewise in succession floater 40 will pull floater 45 from pack 17 and so on. Any desired number of floaters may be used and in heavier aeroplanes, five or six are generally utilized to accomplish a safe and slow landing. Where more than two floaters are used, it is to be understood that each additional floater will be identical in construction and arrangement as to that of floater 40 hereinbefore described.

In event that the aeroplane should catch on fire, the aviator or passenger may quickly unsnap the buckles 9 and then attach it to conventional harness (not shown) carried by the body and thereby save the user's life in making a safe landing with such a device. It is also to be understood that part of the cords nearest to the buckles 9 may be made or covered with asbestos material so that fire or heat will not destroy its utility.

Having thus described our invention, what we claim as new and desire to secure by Letters Patent, is:

1. The combination with a flying machine, of a plurality of parachutes or floaters of general hexagon shape associated therewith for emergency use, means for connecting the parachutes or floaters to the operator of the machine or to the machine itself, said parachutes or floaters being normally contained in a pack, means for ejecting said parachutes or floaters, said parachutes or floaters each supported by a plurality of cords, half of said cords being secured at points relatively close to the different vertices of the hexagon, and the other half of said cords being secured at points approximately midway between the center and vertices of the hexagon, and as for the purpose set forth.

2. The combination with a flying machine, of a plurality of parachutes or floaters of general hexagon shape associated therewith for emergency use, means for connecting the parachutes or floaters to the operator of the machine or to the machine itself, said parachutes or floaters being normally contained in a pack, means for ejecting said parachutes or floaters, said parachutes or floaters each supported by a plurality of cords, half of said cords being secured at points relatively close to the various vertices of the hexagon, and the other half of said cords being secured at various points approximately midway between the center and vertices of the hexagon, all of which cords extend in a parallel direction, and as for the purpose set forth.

3. The combination with a flying machine, of a plurality of parachutes or floaters of general hexagon shape associated therewith for emergency use, means for connecting the parachutes or floaters to the operator of the machine or to the machine itself, said parachutes or floaters being normally contained in a pack, means for ejecting said parachutes or floaters, so that one will be disposed above the other, said parachutes or floaters each supported by a plurality of cords, half of said cords being secured at points relatively close to the different vertices of the hexagon, and the other half of said cords being secured at points approximately midway between the center and vertices of the hexagon, and as for the purpose set forth.

4. The combination with a flying machine, of a plurality of parachutes or floaters of general hexagon shape associated therewith for emergency use, means for connecting the parachutes or floaters to the operator of the machine or to the machine itself, said parachutes or floaters being normally contained in a pack, means for ejecting said parachutes or floaters, so that one will be disposed above the other, said parachutes or floaters each supported by a plurality of cords, half of said cords being secured at points relatively close to the various vertices of the hexagon, and the other half of said cords being secured at various points approximately midway between the center and vertices of the hexagon, all of which cords extend in a parallel direction when the parachutes or floaters are thrown into use, and as for the purpose set forth.

In testimony whereof we have affixed our signatures.

FRANCIS LEVI GRISSOM.
JOHN W. GARRETT.